United States Patent
Nam et al.

(10) Patent No.: US 8,565,066 B2
(45) Date of Patent: Oct. 22, 2013

(54) SYSTEM AND METHOD FOR AN UPLINK ACKNOWLEDGEMENT TRANSMISSION IN CARRIER-AGGREGATED WIRELESS COMMUNICATION SYSTEMS

(75) Inventors: Young-Han Nam, Plano, TX (US); Jianzhong Zhang, Irving, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 807 days.

(21) Appl. No.: 12/456,618

(22) Filed: Jun. 19, 2009

(65) Prior Publication Data

US 2010/0172290 A1    Jul. 8, 2010

Related U.S. Application Data

(60) Provisional application No. 61/204,619, filed on Jan. 8, 2009.

(51) Int. Cl.
*H04L 5/12* (2006.01)
*H04W 4/00* (2009.01)

(52) U.S. Cl.
USPC ............ 370/215; 370/328; 370/329; 370/338

(58) Field of Classification Search
USPC .................................................. 370/329–338
See application file for complete search history.

(56) References Cited

U.S. PATENT DOCUMENTS

| | | | |
|---|---|---|---|
| 2007/0047474 A1* | 3/2007 | Anderson | 370/277 |
| 2008/0232307 A1* | 9/2008 | Pi et al. | 370/328 |
| 2008/0298488 A1* | 12/2008 | Shen et al. | 375/260 |
| 2009/0046649 A1* | 2/2009 | Gao et al. | 370/329 |
| 2009/0213769 A1* | 8/2009 | Shen et al. | 370/280 |
| 2009/0303978 A1* | 12/2009 | Pajukoski et al. | 370/345 |

\* cited by examiner

*Primary Examiner* — Brandon Renner

(57) ABSTRACT

A system and method of uplink acknowledgement transmission. The wireless network implements carrier aggregation wherein a subscriber station may be allocated downlink resource blocks distributed over multiple downlink carriers. The subscriber station receives control channel elements from at least one base station on at least two downlink carriers. The subscriber station derives uplink acknowledgement signal cyclic shift resource indices for respective carriers from functions of the index of the control channel elements that have carried a downlink grant the respective downlink carrier. The subscriber station transmits N number of ACK/NACK symbols in at least one physical uplink channel resource.

27 Claims, 11 Drawing Sheets ial Patent No. 61/204,619.

SYSTEM AND METHOD FOR AN UPLINK ACKNOWLEDGEMENT TRANSMISSION IN CARRIER-AGGREGATED WIRELESS COMMUNICATION SYSTEMS

CROSS-REFERENCE TO RELATED APPLICATION(S) AND CLAIM OF PRIORITY

The present application is related to U.S. Provisional Patent No. 61/204,619, filed Jan. 8, 2009, entitled "UL ACKNOWLEDGEMENT TRANSMISSION IN CARRIER-AGGREGATED WIRELESS COMMUNICATION SYSTEMS". Provisional Patent No. 61/204,619 is assigned to the assignee of the present application and is hereby incorporated by reference into the present application as if fully set forth herein. The present application hereby claims priority under 35 U.S.C. §119(e) to U.S. Provisional Patent No. 61/204,619.

TECHNICAL FIELD OF THE INVENTION

The present application relates generally to wireless communications and, more specifically, to a system and method for uplink acknowledgement transmissions.

BACKGROUND OF THE INVENTION

Modern communications demand higher data rates and performance. Multiple input, multiple output (MIMO) antenna systems, also known as multiple-element antenna (MEA) systems, achieve greater spectral efficiency for allocated radio frequency (RF) channel bandwidths by utilizing space or antenna diversity at both the transmitter and the receiver, or in other cases, the transceiver.

In MIMO systems, each of a plurality of data streams is individually mapped and modulated before being precoded and transmitted by different physical antennas or effective antennas. The combined data streams are then received at multiple antennas of a receiver. At the receiver, each data stream is separated and extracted from the combined signal. This process is generally performed using a minimum mean squared error (MMSE) or MMSE-successive interference cancellation (SIC) algorithm.

In $3^{rd}$ Generation Partnership Project (3GPP) Long Term Evolution (LTE) systems, the base station transmits a Downlink (DL) grant to a subscriber station in a Physical Downlink Control Channel (PDCCH). Some frames later, the subscriber station transmits an Acknowledgement (ACK) or Negative Acknowledgement (NACK) to the base station.

SUMMARY OF THE INVENTION

A subscriber station capable of communicating with a plurality of base stations is provided. The subscriber station includes a receiver adapted to receive control channel elements on at least two downlink carriers. The subscriber station also includes a transmitter configured to derive a first uplink acknowledgement signal cyclic shift resource index for a first carrier from a first function of the index of the control channel elements that have carried a downlink grant in a first downlink carrier. The transmitter also derives a second uplink acknowledgement signal cyclic shift resource index for a second carrier from a second function of the index of the control channel elements that have carried a downlink grant in a second downlink carrier.

A base station capable of wireless communications is provided. The base station includes a transmitter configured to transmit control channel elements on at least two downlink carriers. The base station also includes a receiver configured to receive acknowledgement/negative acknowledgement (ACK/NACK) signals in physical uplink control channel resources corresponding to each of the at least two downlink carriers. A first uplink acknowledgement cyclic shift resource index for a first carrier is derived from a first function of the index of the control channel elements that have carried a downlink grant in a first downlink carrier. Additionally, a second uplink acknowledgement cyclic shift resource index for a second carrier is derived from a second function of the index of the control channel elements that have carried a downlink grant in a second downlink carrier.

A method for transmitting acknowledgement signals in carrier-aggregated wireless communications in response to downlink transmission in a number of downlink carriers is provided. The method includes deriving a first uplink acknowledgement signal cyclic shift resource index for a first carrier from a first function of the index of the control channel elements that have carried a downlink grant in a first downlink carrier. Additionally, a second uplink acknowledgement signal cyclic shift resource index for a second carrier is derived from a second function of the index of the control channel elements that have carried a downlink grant in a second downlink carrier.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

With regard to the following description, it is noted that the 3GPP Long Term Evolution (LTE) term "node B" is another term for "base station" used below. Also, the LTE term "user equipment" or "UE" is another term for "subscriber station" used below.

Figure 1:
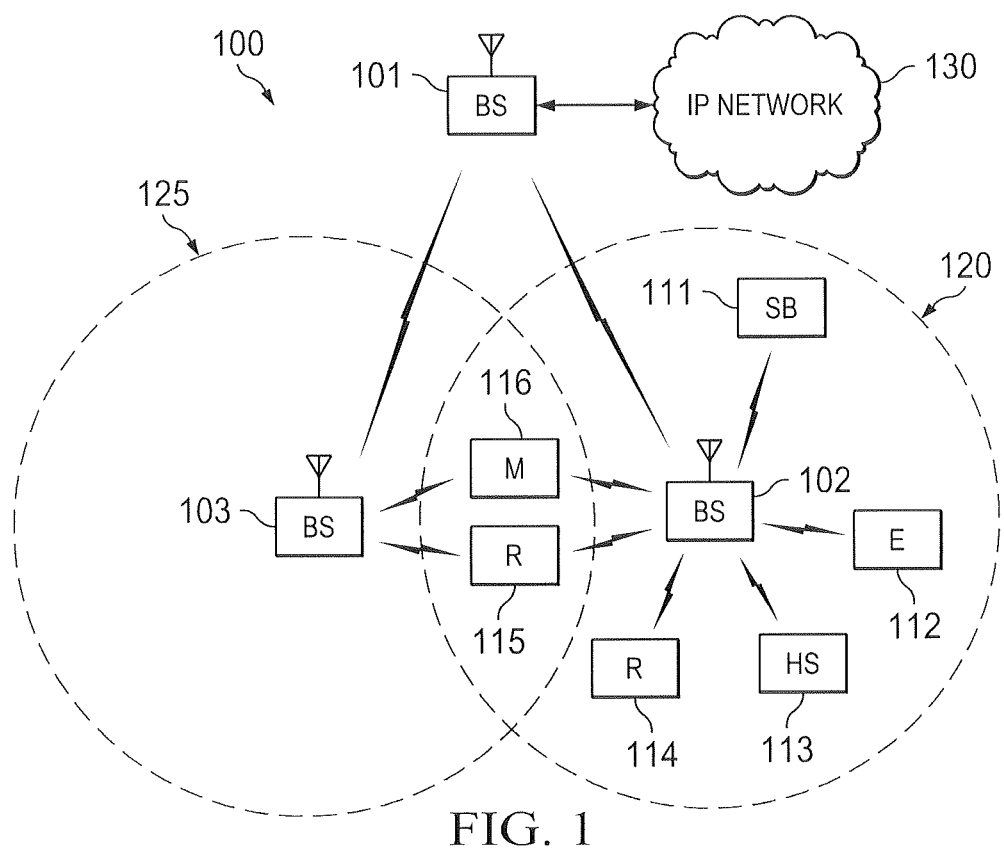
FIG. 1 illustrates an Orthogonal Frequency Division Multiple Access (OFDMA) wireless network that is capable of decoding data streams according to one embodiment of the present disclosure.

FIG. 1 illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for Internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2A:
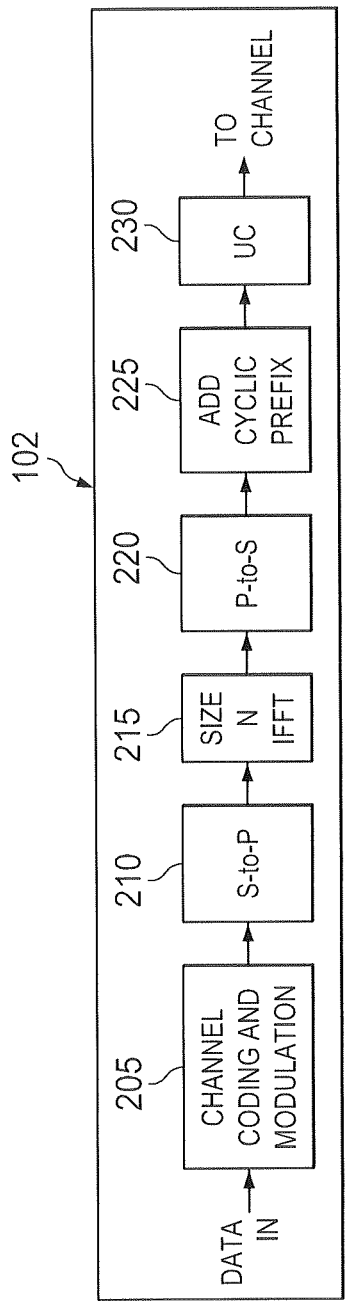
FIG. 2A is a high-level diagram of an OFDMA transmitter according to one embodiment of the present disclosure.
Figure 2B:
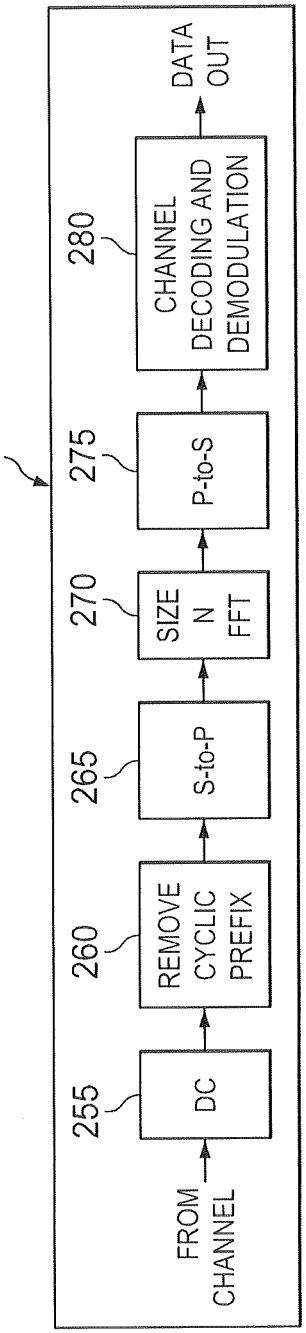
FIG. 2B is a high-level diagram of an OFDMA receiver according to one embodiment of the present disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes methods and systems to convey information relating to base station configuration to subscriber stations and, more specifically, to relaying base station antenna configuration to subscriber stations. This information can be conveyed through a plurality of methods, including placing antenna configuration into a quadrature-phase shift keying (QPSK) constellation (e.g., n-quadrature amplitude modulation (QAM) signal, wherein n is 2^x) and placing antenna configuration into the error correction data (e.g., cyclic redundancy check (CRC) data). By encoding antenna information into either the QPSK constellation or the error correction data, the base stations 101-103 can convey base stations 101-103 antenna configuration without having to separately transmit antenna configuration. These systems and methods allow for the reduction of overhead while ensuring reliable communication between base stations 101-103 and a plurality of subscriber stations.

In some embodiments disclosed herein, data is transmitted using QAM. QAM is a modulation scheme that conveys data by modulating the amplitude of two carrier waves. These two waves are referred to as quadrature carriers, and are generally out of phase with each other by 90 degrees. QAM may be represented by a constellation that comprises 2^x points, where x is an integer greater than 1. In the embodiments discussed herein, the constellations discussed will be four point constellations (4-QAM). In a 4-QAM constellation a 2 dimensional graph is represented with one point in each quadrant of the 2 dimensional graph. However, it is explicitly understood that the innovations discussed herein may be used with any modulation scheme with any number of points in the constellation. It is further understood that with constellations with more than four points additional information (e.g., reference power signal) relating to the configuration of the base stations 101-103 may be conveyed consistent with the disclosed systems and methods.

It is understood that the transmitter within base stations 101-103 performs a plurality of functions prior to actually transmitting data. In the 4-QAM embodiment, QAM modulated symbols are serial-to-parallel converted and input to an inverse fast Fourier transform (IFFT). At the output of the IFFT, N time-domain samples are obtained. In the disclosed embodiments, N refers to the IFFT/fast Fourier transform (FFT) size used by the OFDM system. The signal after IFFT is parallel-to-serial converted and a cyclic prefix (CP) is added to the signal sequence. The resulting sequence of samples is referred to as an OFDM symbol.

At the receiver within the subscriber station, this process is reversed, and the cyclic prefix is first removed. Then the signal is serial-to-parallel converted before being fed into the FFT. The output of the FFT is parallel-to-serial converted, and the resulting QAM modulation symbols are input to the QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 3:
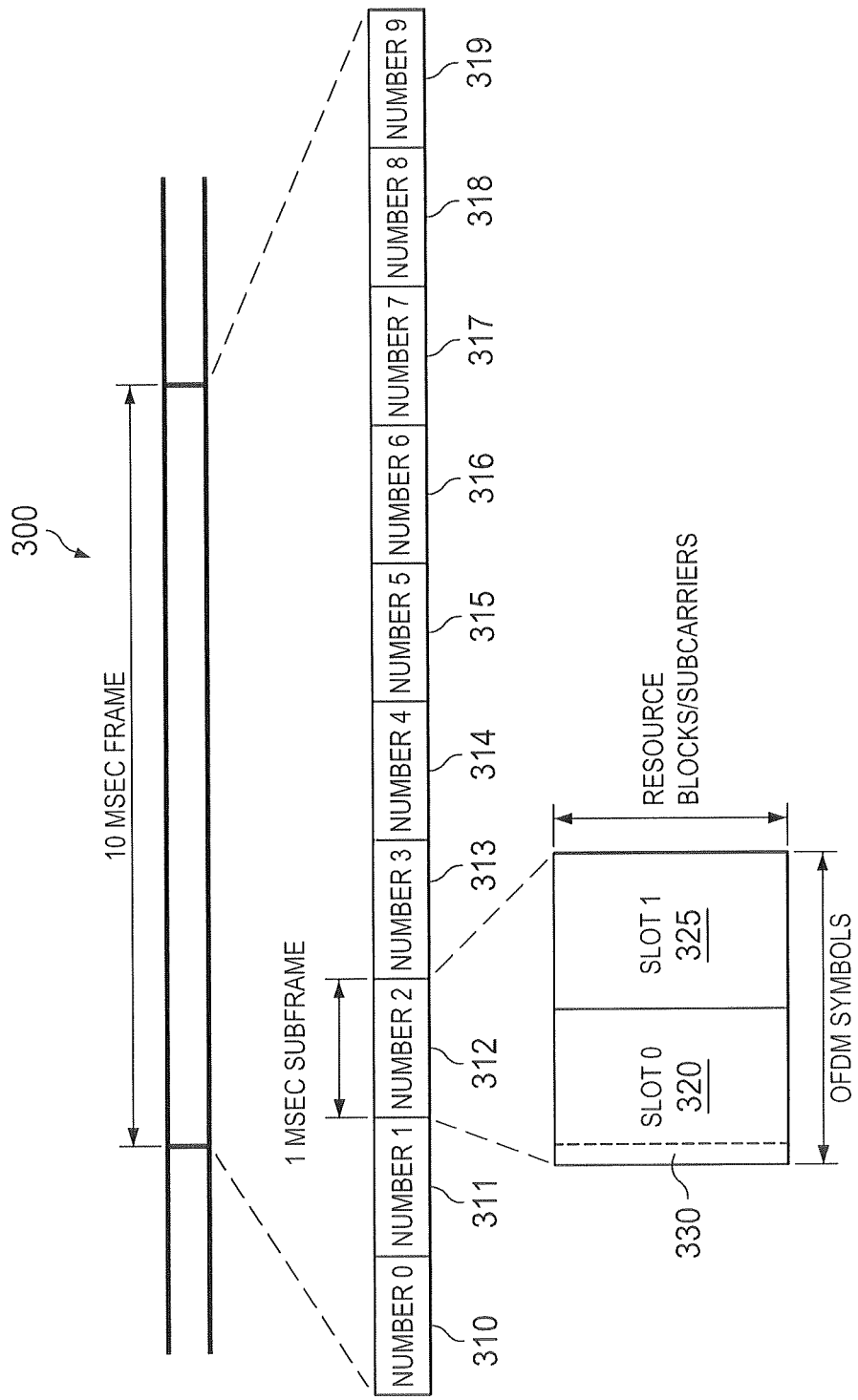
FIG. 3 illustrates an exemplary OFDM frame in the LTE system according to embodiments of the present disclosure.

FIG. 3 illustrates an exemplary OFDM frame in the LTE system according to embodiments of the present disclosure. The embodiment of the frame 300 shown in FIG. 3 is for illustration only. Other embodiments of the LTE frames could be used without departing from the scope of this disclosure.

Time resources in the LTE system are partitioned into ten millisecond (10 msec) frames 300. Each frame 300 is further partitioned into ten (10) sub-frames 310-319. Each sub-frame 310-319 further is divided into two time slots 320, 325. The two time slots 320, 325 are half a millisecond (0.5 msec) each.

Figure 4:
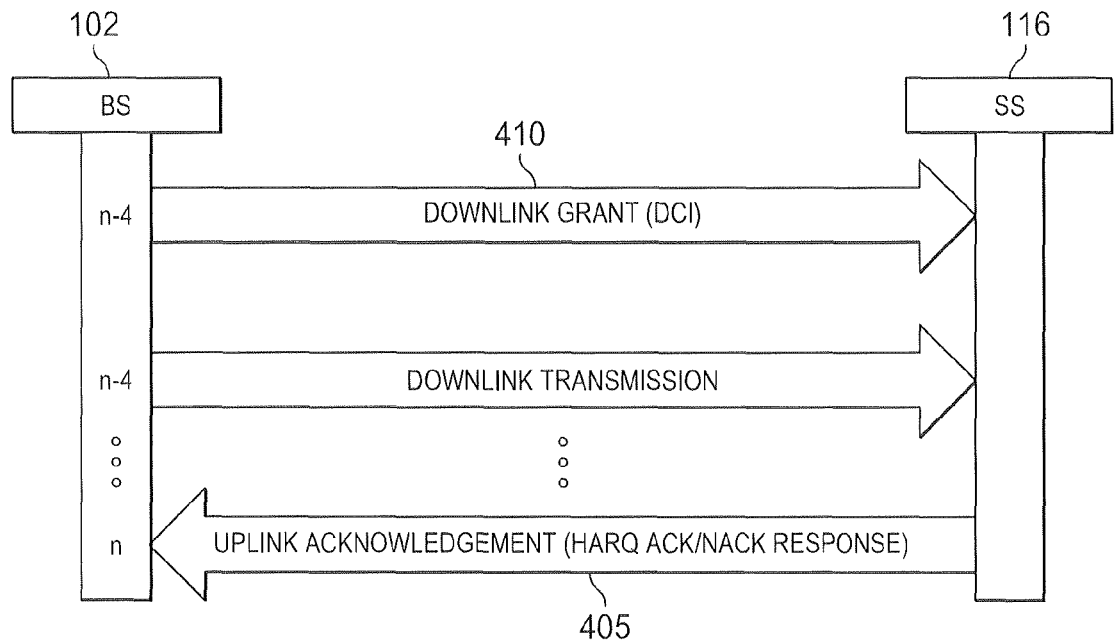
FIG. 4 illustrates a flow diagram for messages between a base station and a subscriber station according to embodiments of the present disclosure.

FIG. 4 illustrates a flow diagram for messages between a base station and a subscriber station according to embodiments of the present disclosure. The embodiment of the flow diagram shown in FIG. 4 is for illustration only. Other embodiments of the flow diagram could be used without departing from the scope of this disclosure.

BS 102 schedules and initiates a DL transmission to SS 116. For each sub-frame 310-319 in the DL transmission, BS 102 sends DL Control Information (DCI) to SS 116 in the PDCCH. The DCI is located within the first few OFDM symbols in the sub-frame 310-319. For example, the DCI can be located in one or more of sub-frames 310, 311 and 312. The DCI can be located in one of the symbols, used as the DL carrier 330, in the time slot 320, 325 (as illustrated in FIG. 3). The DCI indicates the allocated RBs for SS 116 as well as additional information.

Upon reception of the DL grant targeted to SS 116, SS 116 attempts to decode the transmitted message regarding the allocated RBs. Depending upon the decoding results for each transmitted sub-frame 310-319, SS 116 sends hybrid-ARQ bits (or uplink ACK/NACK bits) to BS 102 a few sub-frames later. For example, in a Frequency-Division Duplex (FDD) system, SS 116 transmits the ACK/NACK response 405 in sub-frame n in response to the decoding result for the DCI 410 received in sub-frame n−4.

Figure 5:
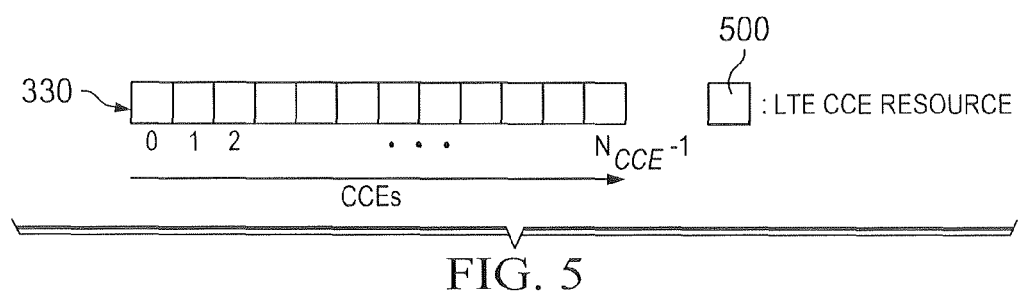
FIG. 5 illustrates Channel Control Element (CCE) resources in a DL carrier.
Figure 6:
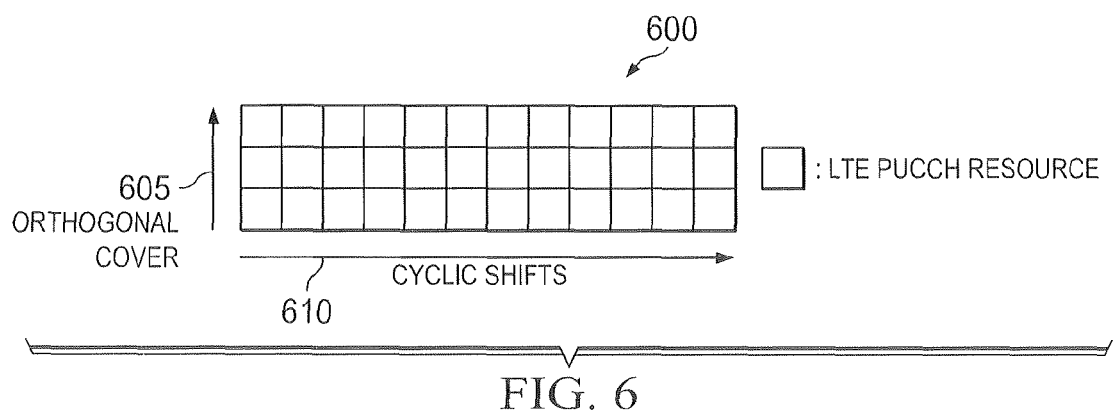
FIG. 6 illustrates an LTE Physical Uplink Control Channel (PUCCH) resource partition in on RB in the Uplink (UL) carrier.

FIG. 5 illustrates Channel Control Element (CCE) resources in a DL carrier. The embodiment of the CCEs 500 shown in FIG. 5 is for illustration only. Other embodiments of the CCEs could be used without departing from the scope of this disclosure.

A PDCCH that carries DCI is transmitted on an aggregation of one or several consecutive CCEs 500. The CCEs 500 available in the DL carrier 330 are numbered from 0 to $N_{CCE}-1$.

The CCEs 500 are control elements used for sending downlink grant. SS 116 reads the CCEs 500 to determine the downlink grant allocated to SS 116. For example, if CCE '012' is sent to SS 116, SS 116 determines that CCE '012' are allocated to SS 116. Therefore, SS 116 not only looks at the content of the CCE but also the location where the content is sent. Therefore, in some embodiments, SS 116 knows which resources to use to respond (e.g., ACK/NACK) based on what CCEs are used for the downlink grant.

FIG. 7 illustrates an LTE Physical Uplink Control Channel (PUCCH) resource partition in on RB in the Uplink (UL) carrier. The embodiment of the PUCCH partition 600 shown in FIG. 7 is for illustration only. Other embodiments of the CCEs could be used without departing from the scope of this disclosure.

UL ACK/NACK (AN) bits are transmitted on PUCCH formats 1a and 1b. Resources used for transmission of PUCCH format 1a/1b are represented by the non-negative index $n_{PUCCH}^{(1)}$. PUCCH resource index $n_{PUCCH}^{(1)}$ determines an orthogonal cover 605 and a cyclic shift 610. The orthogonal cover 605 and cyclic shift 610 indicate a unique resource. For example, thirty six (e.g., 3×12) PUCCH AN resources are available in one RB.

In some embodiments, for FDD, SS 116 uses PUCCH resource $n_{PUCCH}^{(1)}$ for transmission of HARQ-ACK in sub-frame n, where:

a) for a dynamically scheduled Physical Downlink Shared Channel (PDSCH) indicated by the detection of a corresponding PDCCH in subframe n−4, SS 116 uses Equation 1:

$$n_{PUCCH}{}^{(1)} = n_{CCE} + N_{PUCCH}{}^{(1)}. \qquad \text{[Eqn. 1]}$$

where $n_{CCE}$ is the number of the first CCE used for transmission of the corresponding DCI assignment and $N_{PUCCH}{}^{(1)}$ is configured by higher layers.

b) for a semi-persistently scheduled PDSCH transmission, and where a corresponding DCI is not detected in subframe n−4, the value of $n_{PUCCH}{}^{(1)}$ is configured by higher layers.

Resources used for transmission of PUCCH format 1, 1a and 1b are identified by a resource index $n_{PUCCH}{}^{(1)}$ from which the orthogonal sequence index $n_{oc}(n_s)$ and the cyclic shift $\alpha(n_s,l)$ are determined according to Equations 2, 3 and 4:

$$n_{oc}(n_s) = \begin{cases} \lfloor n'(n_s) \cdot \Delta_{shift}^{PUCCH} / N' \rfloor & \text{for normal cyclic prefix} \\ 2 \cdot \lfloor n'(n_s) \cdot \Delta_{shift}^{PUCCH} / N' \rfloor & \text{for extended cyclic prefix} \end{cases} \qquad \text{[Eqn. 2]}$$

$$\alpha(n_s, l) = 2\pi \cdot n_{cs}(n_s, l) / N_{sc}^{RB} \qquad \text{[Eqn. 3]}$$

$$n_{cs}(n_s) = \qquad \text{[Eqn. 4]}$$

$$\begin{cases} \left[ \begin{pmatrix} n_{cs}^{cell}(n_s, l) + \\ \begin{pmatrix} n'(n_s) \cdot \Delta_{shift}^{PUCCH} + \\ \delta_{offset}^{PUCCH} + \\ \begin{pmatrix} n_{oc}(n_s) \\ \mod \Delta_{shift}^{PUCCH} \end{pmatrix} \end{pmatrix} \mod N' \end{pmatrix} \right] \mod N_{sc}^{RB} & \text{for normal cyclic prefix} \\ \left[ \begin{pmatrix} n_{cs}^{cell}(n_s, l) + \\ \begin{pmatrix} n'(n_s) \cdot \Delta_{shift}^{PUCCH} + \\ \delta_{offset}^{PUCCH} + \\ n_{oc}(n_s)/2 \end{pmatrix} \mod N' \end{pmatrix} \right] \mod N_{sc}^{RB} & \text{for extended cyclic prefix} \end{cases}$$

where:

$$N' = \begin{cases} N_{cs}^{(1)} & \text{if } n_{PUCCH}^{(1)} < c \cdot N_{cs}^{(1)} / \Delta_{shift}^{PUCCH} \\ N_{sc}^{RB} & \text{otherwise} \end{cases}$$

$$c = \begin{cases} 3 & \text{normal cyclic prefix} \\ 2 & \text{extended cyclic prefix} \end{cases}$$

The resource indices within the two RBs in the two time slots 320, 325 of a sub-frame to which the PUCCH is mapped are given by Equation 5:

$$n'(n_s) = \begin{cases} n_{PUCCH}^{(1)} & \text{if } n_{PUCCH}^{(1)} < c \cdot N_{cs}^{(1)} / \Delta_{shift}^{PUCCH} \\ \left( n_{PUCCH}^{(1)} - c \cdot N_{cs}^{(1)} / \Delta_{shift}^{PUCCH} \right) & \text{otherwise} \\ \mod(c \cdot N_{sc}^{RB} / \Delta_{shift}^{PUCCH}) \end{cases} \qquad \text{[Eqn. 5]}$$

for $n_s \mod 2 = 0$ and by Equation 6:

$$n'(n_s) = \begin{cases} [c(n'(n_s - 1) + 1)] & n_{PUCCH}^{(1)} \geq c \cdot N_{cs}^{(1)} / \\ \mod(cN_{sc}^{RB} / \Delta_{shift}^{PUCCH} + 1) - 1 & \Delta_{shift}^{PUCCH} \\ \lfloor h/c \rfloor + (h \mod c) N' / \Delta_{shift}^{PUCCH} & \text{otherwise} \end{cases} \qquad \text{[Eqn. 6]}$$

for $n_s \mod 2 = 1$, where $h = (n'(n_s-1)+d) \mod (cN'/\Delta_{shift}^{PUCCH})$, with $d=2$ for normal CP and $d=0$ for extended CP.

The quantities:

$$\Delta_{shift}^{PUCCH} \in \begin{cases} \{1, 2, 3\} & \text{for normal cyclic prefix} \\ \{1, 2, 3\} & \text{for extended cyclic prefix} \end{cases}$$

$$\delta_{offset}^{PUCCH} \in \{0, 1, \ldots, \Delta_{shift}^{PUCCH} - 1\}$$

are set by higher layers.

PUCCH 1a carries one-bit information using Binary Phase Shift Keying (BPSK) (+1,−1) modulation, while PUCCH 1b carries two-bit information using Quadrature Phase Shift Keying (QPSK) (+1,−1,+j,−j) modulation, where $j=\sqrt{-1}$.

FIGS. 7A-7E illustrate carrier aggregation according to embodiments of the present disclosure. The embodiments of the carrier aggregation shown in FIGS. 7A-7E are for illustration only. Other embodiments of the carrier aggregation could be used without departing from the scope of this disclosure.

As opposed to the LTE system that operate in a single contiguous bandwidth (or in a single carrier), the next generation communication systems (for example, LTE-Advanced and WiMax) allow the aggregation of multiple bandwidths for a subscriber station and for a base station to operate in the resultant aggregated carriers. The bandwidth aggregation can be symmetric or asymmetric.

Figure 7A:
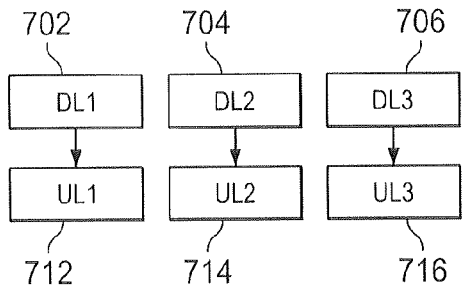
FIGS. 7A-7E illustrate carrier aggregation according to embodiments of the present disclosure.

FIG. 7A illustrates symmetric carrier aggregation according to embodiments of the present disclosure. In symmetric aggregation, the number of carriers in the UL and the DL are the same. For example, when three carriers are aggregated, the DL includes three carriers 702, 704 and 706 and the UL includes three carriers 712, 714, 716.

Figure 7B:
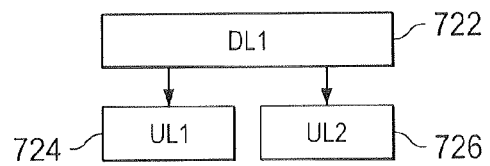
Figure 7C:
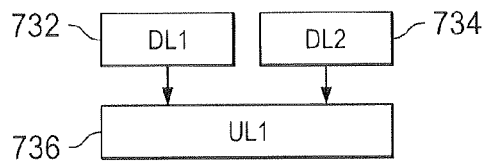
Figure 7D:
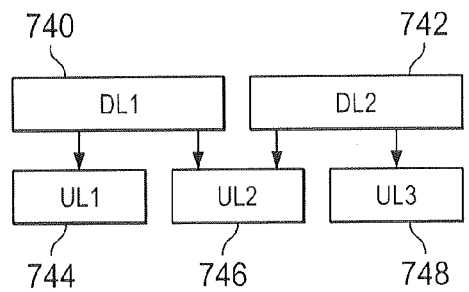
Figure 7E:
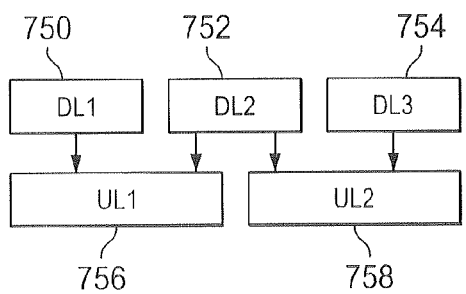

FIGS. 7B-7E illustrate asymmetric carrier aggregation according to embodiments of the present disclosure. In asymmetric aggregation, the number of carriers in the UL and the DL are different. In some examples, the number of carriers in the UL is more than the number of DL carriers. In additional and alternative examples, the number of carriers in the UL is less than the number of DL carriers. FIG. 7B illustrates one DL carrier 822 and two UL carriers 724, 726. FIG. 7C illustrates two DL carriers 732, 734 and one UL carrier 736. FIG. 7D illustrates two DL carriers 740, 742 and three UL carriers 744, 746, 748. FIG. 7E illustrates three DL carriers 750, 752, 754 and two UL carriers 756, 758.

Figure 8A:
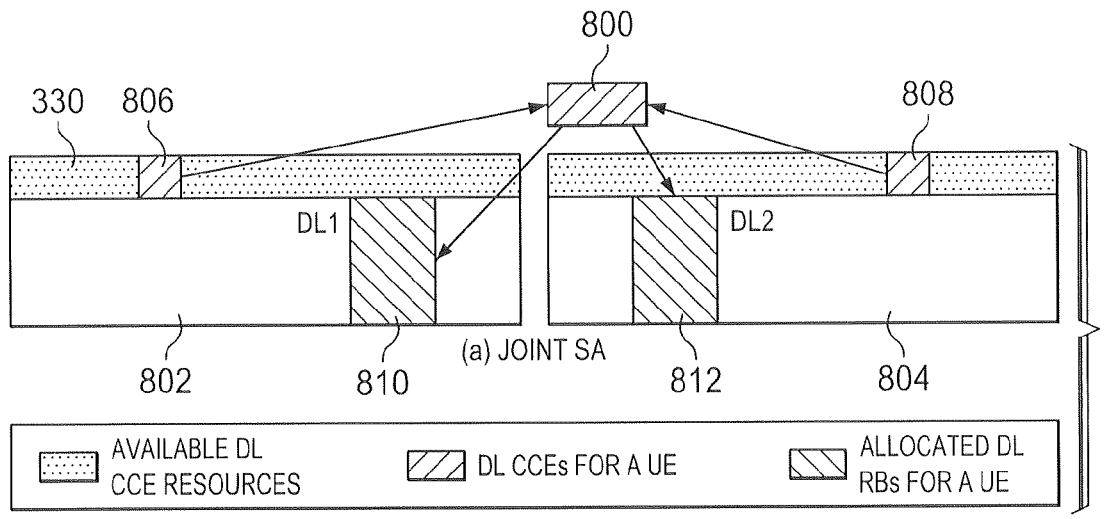
FIGS. 8A and 8B illustrate a distributive transmission of DCI according to embodiments of the present disclosure.
Figure 8B:
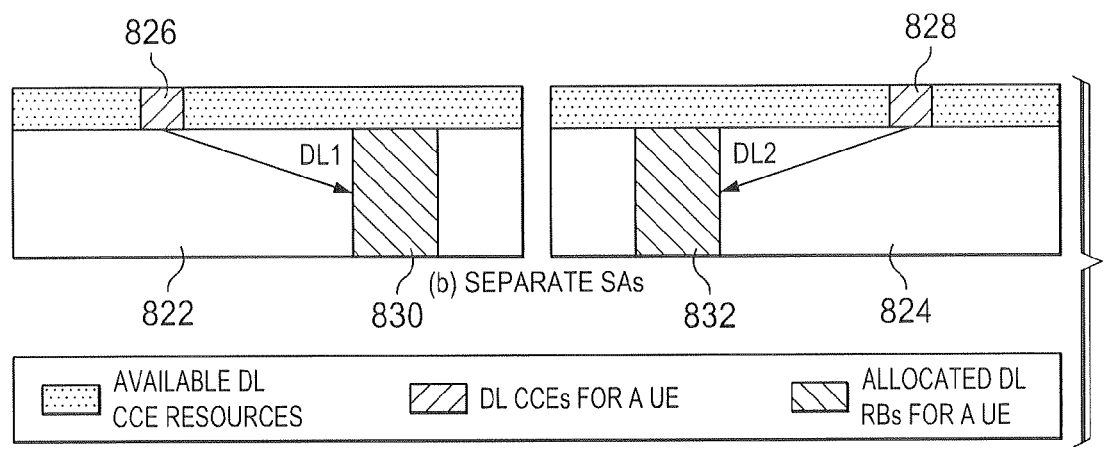

FIGS. 8A and 8B illustrate a distributive transmission of DCI according to embodiments of the present disclosure. The embodiment of the distributive transmission of DCI shown in FIGS. 8A and 8B is for illustration only and other embodiments could be used without departing from the scope of this disclosure.

In some embodiments, BS 102 sends the downlink grant over multiple DL Carriers. For example, SS 116 is allocated DL RBs distributed over multiple DL Carriers. In order to allocate RBs and initiate the transmission, BS 102 sends DCI in CCEs in corresponding multiple carriers. In some additional and alternative embodiments, BS 102 sends DCI in CCEs in only one "anchor" carrier. In such embodiments, the anchor carrier can be assigned by BS 102 through higher layer signalling. Depending upon the CCEs assigned for a DL grant, UL ACK/NACK resource mapping can be done in different ways.

In some embodiments, DCI for SS 116 is transmitted over all the DL carriers allocated to SS 116. Multiple sets of CCE indices are associated with a grant for SS 116. For example, FIGS. 8A and 8B illustrate one set of CCE indices in each component carrier. Two DL carriers are aggregated. Additionally, two sets of CCEs in DL1 and DL2 are used for the transmission of a DL grant (DCI) for SS 116, where the RBs for SS 116 are in component carriers DL1 and DL2. Further, the two sets of CCEs in DL1 and DL2 can be transmitted in the DL carrier 330 in the time slots 320, 325.

In FIG. 8A, a scheduling assignment (SA) 800 for the two DL carriers 802, 804 is carried in an aggregation of the two sets of CCEs 806, 808. As such, each of the sets of CCEs 806 and 808 includes the SA 800. The SA 800 identifies the allocated DL RBs 810, 812 for SS 116.

Additionally and alternatively, in FIG. 8B, SAs for the two DL carriers 822, 824 are carried separately in the two sets of CCEs 826, 828. As such, the first set of CCEs 826 includes a first SA that identifies allocated DL RBs 830 for SS 116 in the first DL carrier 822. Further, the second set of CCEs 828 includes a second SA that identifies allocated DL RBs 832 for SS 116 in the second DL carrier 824.

Figure 9:
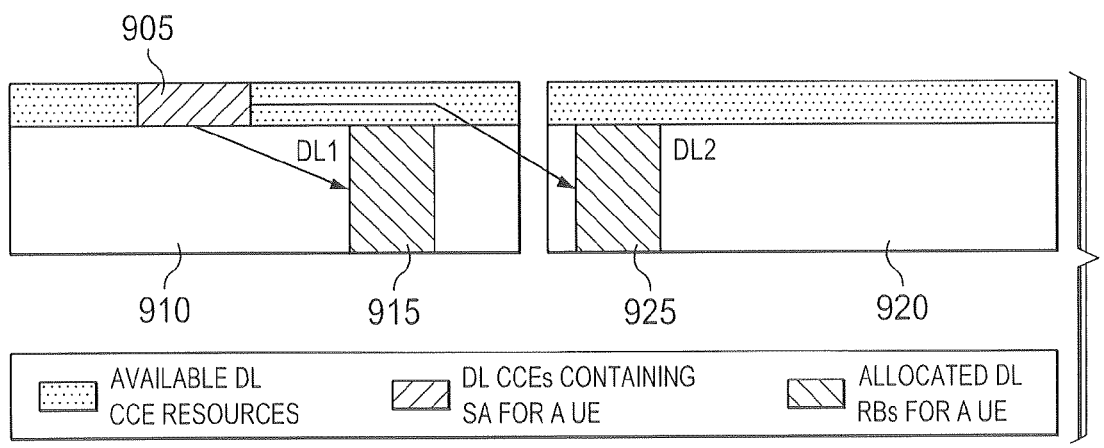
FIG. 9 illustrates a transmission of DCI according to embodiments of the present disclosure.

FIG. 9 illustrates a transmission of DCI according to embodiments of the present disclosure. The embodiment of the transmission of DCI shown in FIG. 9 is for illustration only and other embodiments could be used without departing from the scope of this disclosure.

In some embodiments, the DCI for SS 116 is transmitted over a single DL carrier. In such embodiments, one set of CCE indices is associated with a grant for SS 116. Two DL carriers are aggregated. One set of CCEs 1005 in DL1 910 is used for the transmission of a DL grant (DCI) for SS 116. The set of CCEs includes an SA that identifies the RBs 915, 925 for SS 116 in DL1 910 and DL2 920 respectively. For example, the SA included in the set of CCEs 905 identifies the RBs 915 for SS 116 in DL1 910. Additionally, the SA included the set of CCEs 905 identifies the RBs 925 for SS 116 in DL2 920.

In some embodiments wherein the DCI is transmitted in a single carrier, CCE resources are reserved in other carriers where the DCI is not transmitted while the data still is transmitted. In a reserved CCE, BS 102 does not transmit signals containing SA for SS 116, and any other subscriber station, such as SS 111-115, in the cell of BS 102. The reserved CCEs indices are used to determine the UL resource for ACK/NACK in response to the DL transmission as a result of the SA.

Figure 10A:
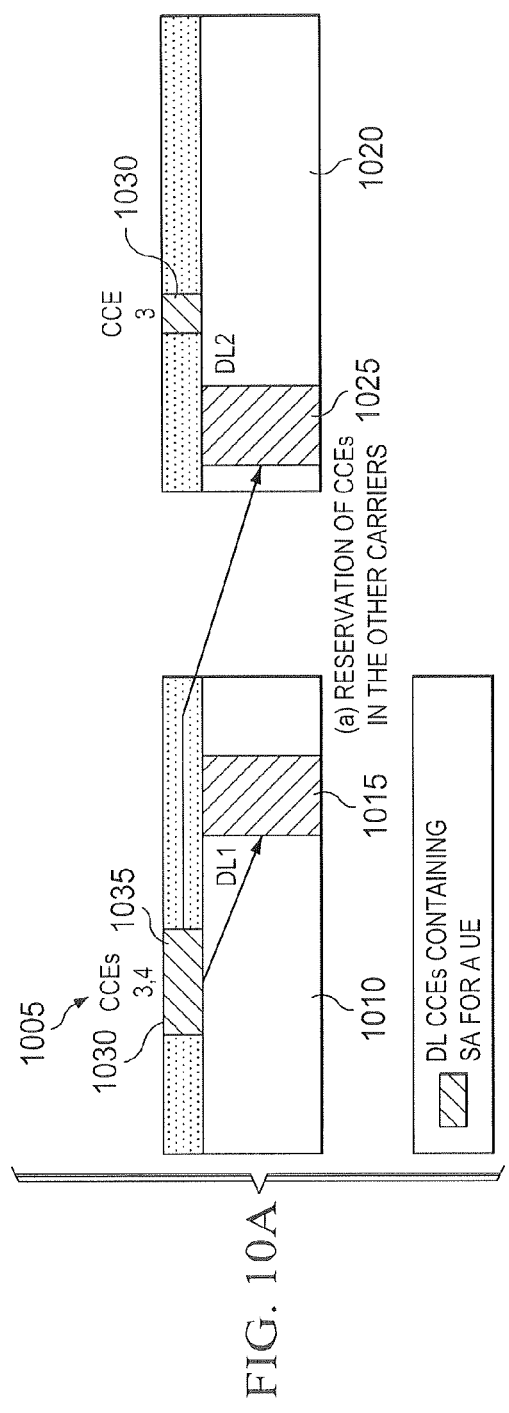
FIGS. 10A and 10B illustrate reservations of CCEs for transmission of DCI in single component carriers according embodiments of the present disclosure.
Figure 10B:
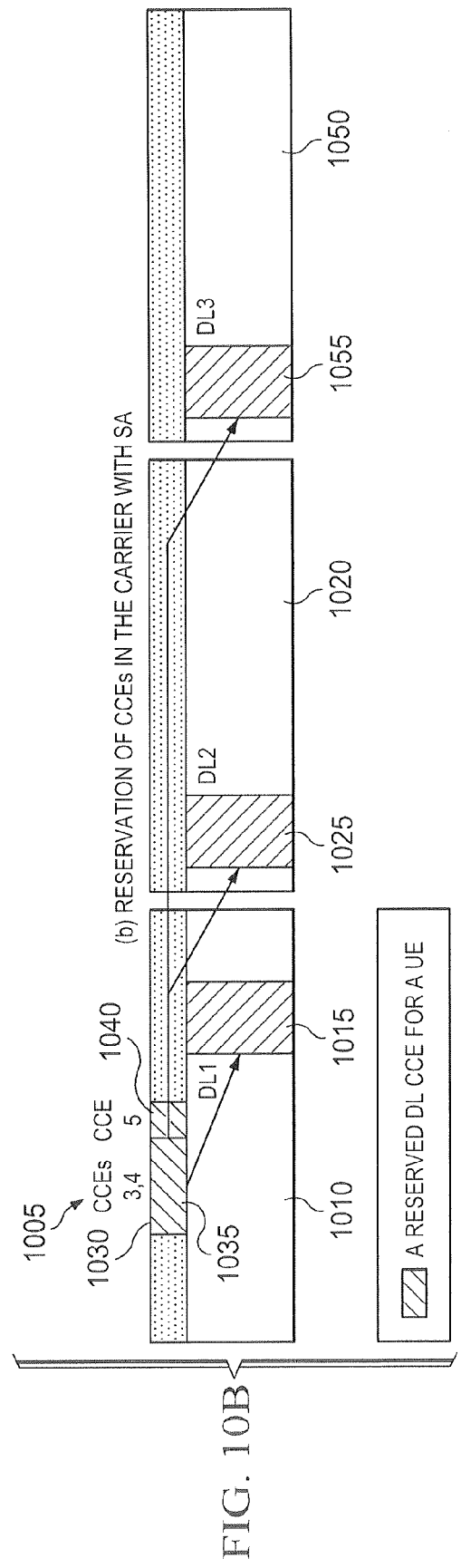

FIGS. 10A and 10B illustrate reservations of CCEs in the case where DCI is transmitted in single component carriers according to embodiments of the present disclosure. The embodiments of the reservations of CCEs shown in FIGS. 10A and 10B are for illustration only. Other embodiments of the reservations of CCEs could be used without departing from the scope of this disclosure.

In some embodiments, illustrated in FIG. 10A, one CCE resource 1030 is reserved for SS 116 in DL carrier 1020. The SA for SS 116 carried in CCE resources 1030 and 1035 in DL1 1010 assigns a first frequency block in DL1 1010 and a second frequency block in DL2 1020, while no CCEs in DL 1020 carry the SA for SS 116. In response to the DL transmission in the two frequency blocks, two ACK/NACK signals are sent in at least two UL resources. SS 116 determines which resources to use to send the ACK/NACK by observing the CCE indices in which the SA for SS 116 is carried and the reserved CCE indices.

In one example, the reserved CCE index in DL2 1020 is the same as the lowest index of the CCEs in the DL carrier carrying the SA. Two sets of RBs 1015 and 1025 each in two DL carriers, DL1 1010 and DL2 1020, are allocated for SS 116 by the SA carried in CCEs 1030 and 1035 in DL1 1010, while the SA is not carried in any of the CCEs in DL2 1020. Then, a CCE resource in DL2 1020 is reserved for SS 116. For example, when CCE3 1030 and CCE4 1035 in DL1 1010 are used for SA for SS 116, BS 102 reserves CCE3 1030 in DL2 1020 for SS 116.

In some embodiments, illustrated in FIG. 10B, CCE resources are reserved for SS 116 in the DL carrier in which the SA for SS 116 is carried if the number of CCEs used for SA (denoted by $N_{CCE}^{SA}$) is smaller than the number of DL carriers that the SA allocates RBs for SS 116 (denoted by $N_{carrier}^{DL}$). For example, in the event that two CCEs are sent for three DL carriers, then a third CCE is reserved by SS 116 for sending the ACK/NACK for the third DL carriers. Conversely, if the number of CCEs used for SA (denoted by $N_{CCE}^{SA}$) is not smaller than the number of DL carriers that the SA allocates RBs for SS 116 (denoted by $N_{carrier}^{DL}$), a reservation of CCE resources is not made. For example, max $(N_{carrier}^{DL}-N_{CCE}^{SA},0)$ CCE resources are reserved for SS 116, where the reserved CCE indices are next to (e.g., adjacent to) the CCE indices for SA for SS 116.

For example, in the event that CCE3 1030 and CCE4 1040 in DL1 1010 are used for SA for SS 116 and the SA allocates RBs 1015, 1025 and 1055 in DL1 1010, DL2 1020 and DL3 1050, then CCE5 1040 in DL1 1010 is reserved, since CCE5 1040 in DL1 1010 is the next adjacent CCE in DL1 1010.

Figure 11:
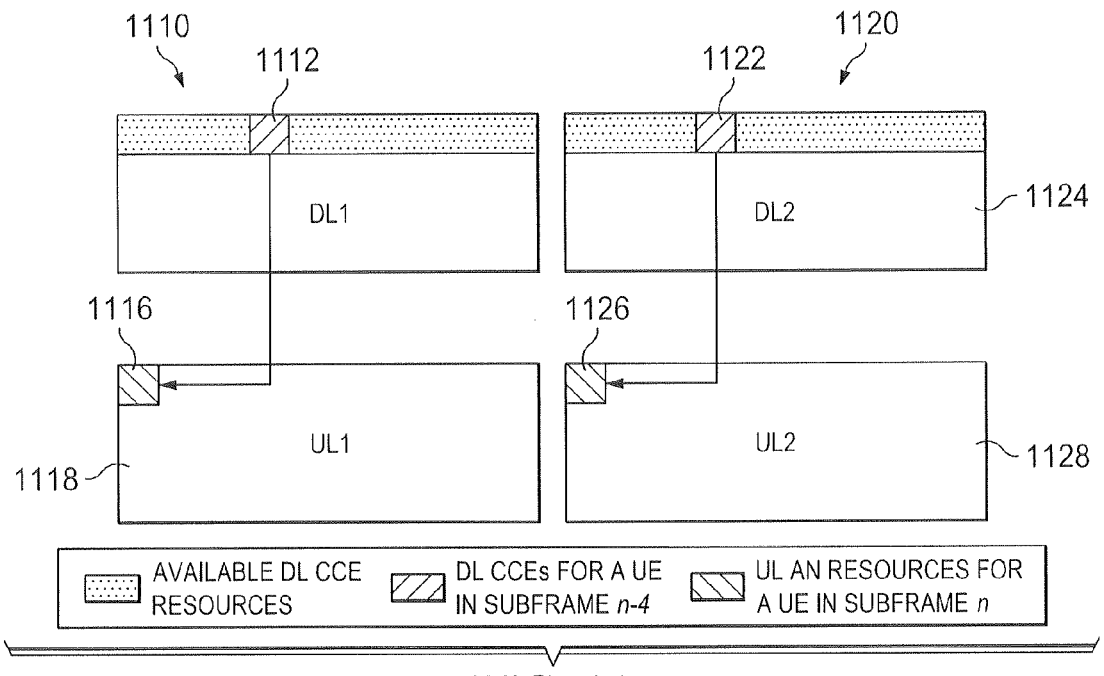
FIG. 11 illustrates a DL CCE index to an UL ACK/NACK resource mapping in a symmetric carrier aggregation according to embodiments of the present disclosure.

FIG. 11 illustrates a DL CCE index to an UL ACK/NACK resource mapping in a symmetric carrier aggregation according to embodiments of the present disclosure. The embodiment of the DL CCE index shown in FIG. 11 is for illustration only and other embodiments could be used without departing from the scope of this disclosure.

One-to-one mapping schemes from DL CCE index to UL ACK/NACK index are defined, extending the DL CCE index to UL ACK/NACK index defined in LTE.

In the case of symmetric carrier aggregation (discussed in further detail hereinabove with respect to FIG. 7A) one-to-one mapping is defined for each pair 1110, 1120 of DL and UL carriers. For each pair 1110, 1120 of DL and UL carriers, the PUCCH ACK/NACK resource index in the UL carrier $n_{PUCCH}^{(1)}$ is a function of the CCE indices in its pairing DL carrier. For each pair 1110, 1120 of DL and UL carriers, the mapping is defined by Equation 7

$$n_{PUCCH}^{(1)} = n_{CCE} + N_{PUCCH}^{(1)}. \quad [\text{Eqn. 7}]$$

where $n_{CCE}$ is the DL CCE index. In addition, a DL-carrier specific parameter $N_{PUCCH}^{(1)}$ is configured by the higher layers.

Two CCE indices 1112, 1122 in DL1 1114 and in DL2 1124 are mapped to two PUCCH ACK/NACK 1116, 1126 indices in UL1 1118 and UL2 1128, according to Equation 8 and 9 respectively:

$$n_{PUCCH,CA1}^{(1)} = n_{CCE,CA1} + N_{PUCCH,CA1}^{(1)}. \quad [\text{Eqn 8}]$$

$$n_{PUCCH,CA2}^{(1)} = n_{CCE,CA2} + N_{PUCCH,CA2}^{(1)}. \quad [\text{Eqn. 9}]$$

In Equations 8 and 9, subscripts CA1 and CA2 imply DL carriers DL1 1114 and DL2 1124. $N_{PUCCH,CA1}^{(1)}$ and $N_{PUCCH,CA1}^{(2)}$ can be configured by the higher layers to be either the same or different.

Figure 12:
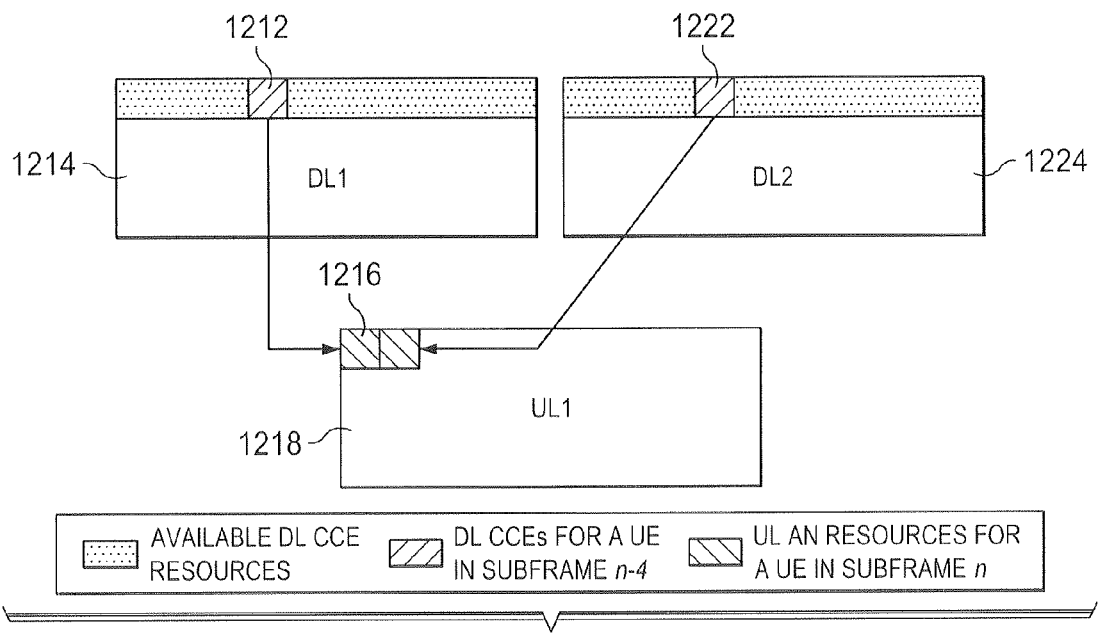
FIG. 12 illustrates a DL CCE index to an UL ACK/NACK resource mapping in an asymmetric carrier aggregation according to embodiments of the present disclosure.

FIG. 12 illustrates a DL CCE index to an UL ACK/NACK resource mapping in an asymmetric carrier aggregation according to embodiments of the present disclosure. The embodiment of the DL CCE index shown in FIG. 12 is for illustration only and other embodiments could be used without departing from the scope of this disclosure In the case of asymmetric carrier aggregation with only one UL carrier and multiple DL carriers (discussed in further detail herein above with respect to FIG. 7C), multiple sets of PUCCH resources are assigned in the UL carrier, one set per DL carrier. For each pair of a set of PUCCH resources and a DL carrier, the mapping described in Equation 1 is reused.

Two CCE indices 1212, 1222 in DL1 1214 and DL2 1224 are mapped to two PUCCH ACK/NACK indices 1216 in UL1 1218, according to Equations 10 and 11 respectively:

$$n_{PUCCH,CA1}^{(1)} = n_{CCE,CA1} + N_{PUCCH,CA1}^{(1)}. \quad [\text{Eqn. 10}]$$

$$n_{PUCCH,CA2}^{(1)} = n_{CCE,CA2} + N_{PUCCH,CA2}^{(1)}. \quad [\text{Eqn. 11}]$$

Accordingly, two sets of ACK/NACK resources 1216 in UL1 1216 are separately reserved. A first set of ACK/NACK resources are reserved for DL1 1214 and a second set of ACK/NACK resources are reserved for DL2 1224.

Figure 13:
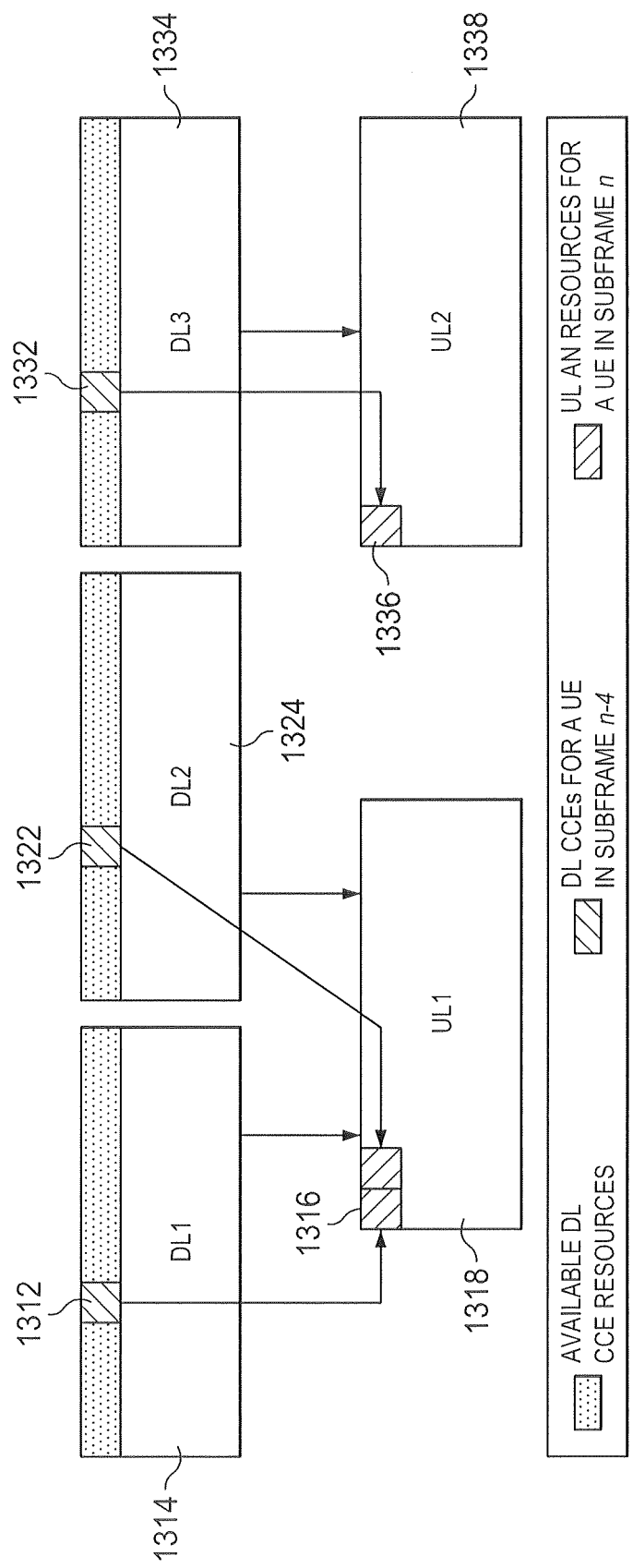
FIG. 13 illustrates a DL CCE index to an UL ACK/NACK resource mapping in an asymmetric carrier aggregation according to embodiments of the present disclosure.

FIG. 13 illustrates a DL CCE index to an UL ACK/NACK resource mapping in an asymmetric carrier aggregation according to embodiments of the present disclosure. The embodiment of the DL CCE index shown in FIG. 13 is for illustration only and other embodiments could be used without departing from the scope of this disclosure.

In the case of asymmetric carrier aggregation with more number of DL carriers than UL carriers (discussed in further detail herein above with respect to FIG. 7E), multiple sets of PUCCH resources are assigned in the available UL carriers. Through higher layer signalling, BS 102 specifies a UL carrier having a set of PUCCH AN resources for each DL carrier. For each pair of a set of PUCCH resources and a DL carrier, the mapping described in Equation 1 is reused.

For example, through higher layer signalling, BS 102 specifies that UL1 1318 has two sets of PUCCH resources 1316 for DL1 1314 and DL2 1324, and UL2 1338 has one set of PUCCH resources 1336 for DL3 1334. The CCE index 1312 in DL1 1314 and the CCE index 1423 in DL2 1324 are mapped to PUCCH ACK/HACK indices 1316 in UL1 1318, according to Equations 12 and 13:

$$n_{PUCCH,CA1}^{(1)} = n_{CCE,CA1} + N_{PUCCH,CA1}^{(1)}. \quad [\text{Eqn. 12}]$$

$$n_{PUCCH,CA2}^{(1)} = n_{CCE,CA2} + N_{PUCCH,CA2}^{(1)}. \quad [\text{Eqn. 13}]$$

Additionally, a CCE index 1332 in DL3 1334 is mapped to PUCCH ACK/NACK index 1336 in UL2 1338 according to Equation 14:

$$n_{PUCCH,CA3}^{(1)} = n_{CCE,CA3} + N_{PUCCH,CA3}^{(1)}. \quad [\text{Eqn. 14}]$$

Accordingly, two sets of DL carriers, e.g., DL1 1314 and DL2 1322 are paired with one UL carrier, e.g., UL1 1318. Additionally, the remaining DL carrier, DL3 1334, is paired with the remaining UL carrier, UL2 1438. The ACK/NACK resources are separately reserved. A first set of ACK/NACK resources are reserved for DL1 1414 and a second set of ACK/NACK resources are reserved for DL2 1324. Additionally, another set of ACK resources 1336 are reserved in UL2 1338 for DL3 1334.

In some embodiments (hereinafter referred to as PUCCH Assignment Method), for a dynamically scheduled DL transmission in multiple DL carriers indicated by the detection of a corresponding SA in CCEs in subframe n−4, SS 116 obtains the PUCCH ACK/NACK indices associated with the multiple DL carriers in subframe n in a number of ways.

In some embodiments, when an SA for SS 116 spreads over the CCEs in all the DL carriers, as illustrated FIGS. 8A and 8B, or when the CCE Reservation as illustrated in FIG. 10A is used, SS 116 obtains PUCCH ACK/NACK resources from the mapping of Equation 1. SS 116 substitutes $n_{CCE}$ by $n_{CCE,CAi}$ for each DL carrier i, where $n_{CCE,CAi}$ is the number of the first CCE in DL carrier i used for transmission of the corresponding SA.

Additionally and alternatively, when the CCE Reservation as illustrated in FIG. 10B is used, SS 116 obtains PUCCH ACK/NACK resources from the mapping of Equation 1. In one example, SS 116 substitutes $n_{CCE}$ by $n_{CCE,i}$ for each DL carrier i, where $n_{CCE,i}$ is the number of the $i^{th}$ lowest CCE in the DL carrier used for transmission of the corresponding SA.

When SS 116 is assigned RBs in $N_{carrier}^{DL}$ DL carriers in an SA, SS 116 has $N_{carrier}^{DL}$ PUCCH resources for AN transmissions, according to the PUCCH Assignment Method. Given these $N_{carrier}^{DL}$ PUCCHs, SS 116 is operable to transmit multiple ACK/NACK bits according to a number of methods.

In some embodiments (herein also referred to as "Method A"), PUCCH i carries ACK/NACK bits in sub-frame n, associated with the DL transmission in DL carrier i in sub-frame n−4. When this method is applied, multiple ACK/NACK signals can be transmitted in multiple UL carriers in a sub-frame, which may result in an increased Peak-to-Power Ratio (PAPR) or an increased Cubic Metric (CM). However, High PAPR or CM causes high-amplitude signal components to suffer from power amplifier distortion due to the dynamic range limitation.

In some embodiments (herein also referred to as "Method B"), a carrier-specific offset is applied to the AN cyclic shift (CS) resource. For example, in a system operating in multiple pairs of UL and DL carriers, the CS resource is determined by Equations 15 and 16:

$$\alpha(n_s, l) = 2\pi \cdot n_{cs}(n_s, l) / N_{sc}^{RB} \quad [\text{Eqn. 15}]$$

$$n_{cs}(n_s, l) = \quad [\text{Eqn. 16}]$$

$$\begin{cases} \left[ n_{cs}^{cell}(n_s, l) + \begin{pmatrix} n'(n_s) \cdot \Delta_{shift}^{PUCCH} + \\ \delta_{offset}^{PUCCH} + \\ N_{Carrier\,ID} + \\ \begin{pmatrix} n_{oc}(n_s) \\ \text{mod} \Delta_{shift}^{PUCCH} \end{pmatrix} \end{pmatrix} \text{mod} N' \right] \text{mod} N_{sc}^{RB} & \text{for normal cyclic prefix} \\ \left[ n_{cs}^{cell}(n_s, l) + \begin{pmatrix} n'(n_s) \cdot \Delta_{shift}^{PUCCH} + \\ \delta_{offset}^{PUCCH} + \\ N_{Carrier\,ID} + \\ n_{oc}(n_s)/2 \end{pmatrix} \text{mod} N' \right] \text{mod} N_{sc}^{RB} & \text{for extended cyclic prefix} \end{cases}$$

where an additional parameter $N_{Carrier\,ID}$ to $\delta_{offset}^{PUCCH}$ is added in the PUCCH CS Equation 4 in LTE. $N_{Carrier\,ID}$ is a unique DL carrier ID.

In an another example system, the CS resource is determined by Equations 17 and 18:

$$\alpha(n_s, l) = 2\pi \cdot n_{cs}(n_s, l)/N_{sc}^{RB} \quad \text{[Eqn. 17]}$$

$$n_{cs}(n_s, l) = \quad \text{[Eqn. 18]}$$

$$\begin{cases} \left[\begin{array}{c} n_{cs}^{cell}(n_s, l) + \\ N_{Carrier\ ID} + \\ \left(n'(n_s) \cdot \Delta_{shift}^{PUCCH} + \right) \\ \delta_{offset}^{PUCCH} + \\ \left(\dfrac{n_{oc}(n_s)}{\text{mod}\Delta_{shift}^{PUCCH}}\right) \end{array}\right] \text{mod}N' & \text{mod}N_{sc}^{RB} \text{ for normal cyclic prefix} \\ \left[\begin{array}{c} n_{cs}^{cell}(n_s, l) + \\ N_{Carrier\ ID} + \\ \left(n'(n_s) \cdot \Delta_{shift}^{PUCCH} + \right) \\ \delta_{offset}^{PUCCH} + \\ n_{oc}(n_s)/2 \end{array}\right] \text{mod}N' & \text{mod}N_{sc}^{RB} \text{ for extended cyclic prefix} \end{cases}$$

In Equations 17 and 18, $N_{Carrier\ ID}$ to $n_{cs}^{cell}(n_s,l)$ is added in the PUCCH CS Equation 4 in LTE.

Figure 14:
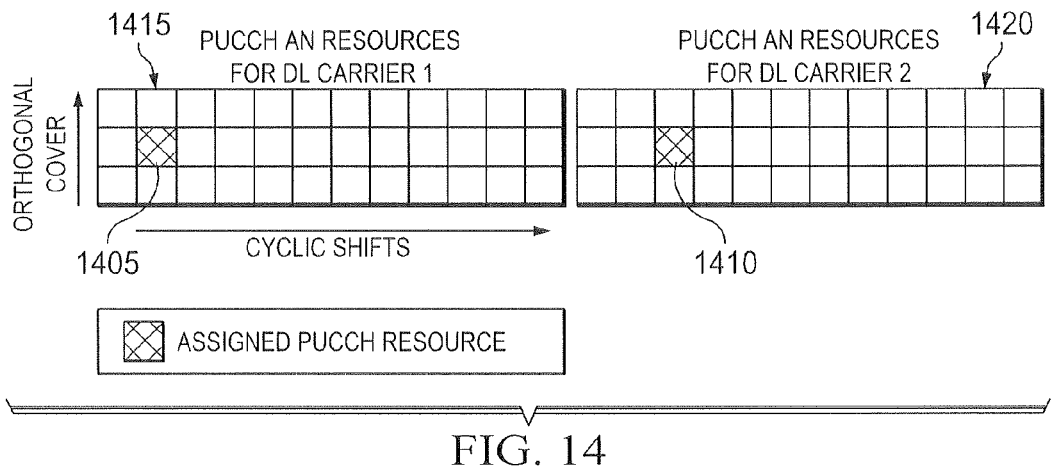
FIG. 14 illustrates a method using carrier-specific offsets according to embodiments of the present disclosure.

FIG. 14 illustrates a method using carrier-specific offsets according to embodiments of the present disclosure. The embodiment of the carrier-specific offset shown in FIG. 14 is for illustration only and other embodiments could be used without departing from the scope of this disclosure.

In an example of Method B, two PUCCH resources 1405, 1410 are assigned for the UL ACK/NACK (AN) transmission in response to a DL transmission in two component carriers. Two DL carriers DL1 1415 and DL2 1420 have DL carrier IDs $N_{Carrier\ ID}=0$ and $N_{Carrier\ ID}=1$, respectively. With all the other parameters, including the CCE index carrying the DL grants, set the same in both carriers, DL1 1415 and DL2 1420, in the event that the PUCCH resource in UL carrier 1 has CS 1, while the PUCCH resource in UL carrier 2 has CS 2, if the CS offset value in the DL2 1415 is set to be '1'.

Figure 15:
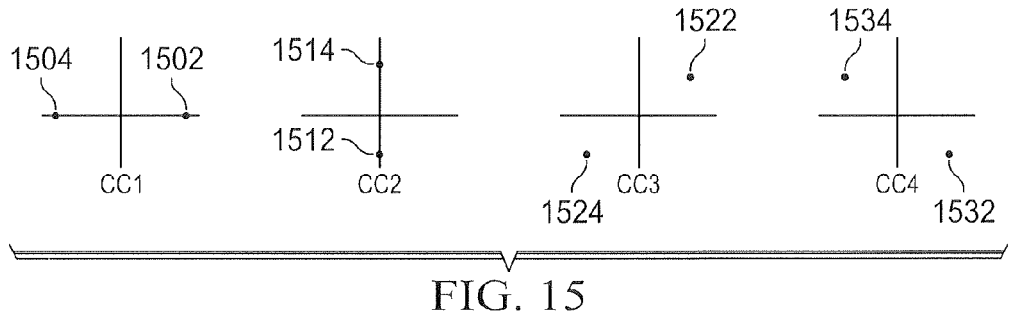
FIGS. 15 and 16 illustrate a method using carrier-specific phase rotation according to embodiments of the present disclosure.
Figure 16:
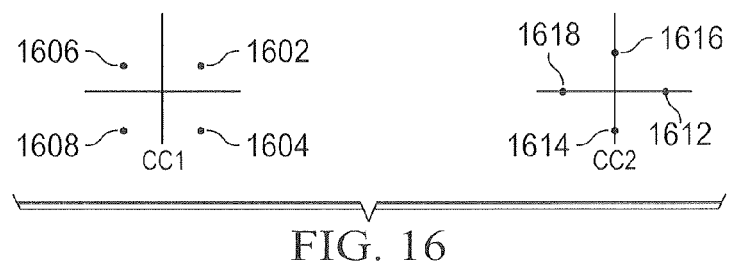

FIGS. 15 and 16 illustrate a method (herein also referred to as "Method C") using carrier-specific phase rotation according to embodiments of the present disclosure. The embodiments of the carrier-specific phase rotation shown in FIGS. 15 and 16 are for illustration only and other embodiments could be used without departing from the scope of this disclosure.

In some embodiments, a carrier-specific phase rotation is applied on the modulation symbols used for UL ACK/NACK transmission. In each PUCCH for ACK/NACK (AN) transmissions, differently rotated modulation symbols are used. In PUCCH i using format 1a or BPSK, $(+e^{j\phi_i}, -e^{j\phi_i})$ modulation is used, while in PUCCH 1 using format 1b or QPSK, $(+e^{j\phi_i}, -e^{j\phi_i}, +je^{j\phi_i}, -je^{j\phi_i})$ modulation is used, where $\phi_i$ and $\phi_l$ are parameters that can be optimized. In one example, format 1a is used in all the PUCCHs.

In FIG. 15, example phase-rotated BPSK modulations with different values of $\phi_i$'s are illustrated, where $\phi_i$ values are $$0, \frac{\pi}{4}, \frac{3\pi}{4}, \pi$$

from the left to the right. For example, when four PUCCHs are used for the transmission of four AN bits in a sub-frame, (+1,−1), (+j,−j), $$\left(+\frac{1+j}{\sqrt{2}}, -\frac{1+j}{\sqrt{2}}\right), \left(+\frac{-1+j}{\sqrt{2}}, -\frac{-1+j}{\sqrt{2}}\right)$$

modulations are used in PUCCHs 1, 2, 3 and 4, respectively. In another example, format 1b is used in all the PUCCHs associated with the DL transmission.

For example, in CC1, an ACK is transmitted as illustrated by a point 1502 and a NACK is transmitted as illustrated by a point 1504. However, in CC2 constellation points are phase rotated from CC1 such that an ACK is transmitted as illustrated by a point 1512 and a NACK is transmitted as illustrated by a point 1514. Additionally, CC3 also is phase rotated such that an ACK is transmitted as illustrated by a point 1522 and a NACK is transmitted as illustrated by a point 1524. Further, CC4 also is phase rotated from CC1 such that an ACK is transmitted as illustrated by a point 1532 and a NACK is transmitted as illustrated by a point 1534.

In FIG. 16, example phase-rotated QPSK modulations with different values of $\phi_i$'s are illustrated, where $\phi_i$ values are $$\frac{\pi}{4}, 0$$

from the left to the right. For example, when two PUCCHs are used for the transmission of two AN bits in a sub-frame, $$\left(+\frac{1+j}{\sqrt{2}}, -\frac{1+j}{\sqrt{2}}, +\frac{-1+j}{\sqrt{2}}, -\frac{-1+j}{\sqrt{2}}\right)$$

and (+1,−1,+j,−j) modulations are used in PUCCHs 1 and 2, respectively.

In some embodiments, only one PUCCH carries signals for the transmission of multiple UL AN bits. The PUCCH is selected among the assigned PUCCHs. The selection itself provides additional information. There exists $N_{carrier}^{DL}$ ways to select one PUCCH among these $N_{carrier}^{DL}$ PUCCHs. In such embodiments, multiple AN bits are associated with the selected PUCCH index i and the QPSK symbol sent over PUCCH i. The association rules can be optimized for different purposes.

For example, in CC1, an ACK/ACK is transmitted as illustrated by a point 1602; a ACK/NACK is illustrated by a point 1604; a NACK/ACK is illustrated by a point 1606; and a NACK/NACK is transmitted as illustrated by a point 1608. However, in CC2 is phase rotated from CC1 such that an ACK/ACK is transmitted as illustrated by a point 1612; a ACK/NACK is illustrated by a point 1614; a NACK/ACK is illustrated by a point 1616; and a NACK/NACK is transmitted as illustrated by a point 1618.

In one example, two PUCCH resources '1' and '2' are reserved for the AN transmissions associated with the DL transmission in two component carriers. One example association is shown in Table 1. For instance, when AN bits are (ACK,ACK), QPSK symbol +1 is transmitted in the selected PUCCH channel, i.e., PUCCH channel 1.

TABLE 1

An example association from the selected PUCCH
index i and QPSK symbol $q_i$ to two AN bits.

| AN Bits | $(i, q_i)$ |
|---|---|
| (ACK, ACK) | (1, +1) |
| (ACK, NACK) | (1, −1) |
| (NACK, ACK) | (2, +1) |
| (NACK, NACK) | (2, −1) |

For example, an ACK/ACK is detected when BS 102 receives a "+1" on channel '1'. Additionally, an ACK/NACK is detected when BS 102 receives a "−1" on channel '1'. Further, an NACK/ACK is detected when BS 102 receives a "+1" on channel '2' and an NACK/NACK is detected when BS 102 receives a "−1" on channel '2'.

In another example, three PUCCH resources '1', '2' and '3' are reserved for the AN transmissions associated with the DL transmission in three component carriers. One example association is shown in Table 2. For instance, when AN bits are (ACK,ACK,ACK), QPSK symbol +1 is transmitted in the selected PUCCH channel, i.e., PUCCH channel 1.

TABLE 2

An example association from the selected PUCCH
index i and QPSK symbol $q_i$ to three AN bits

| AN Bits | $(i, q_i)$ |
|---|---|
| (ACK, ACK, ACK) | (1, +1) |
| (ACK, ACK, NACK) | (1, +j) |
| (ACK, NACK, ACK) | (1, −j) |
| (ACK, NACK, NACK) | (2, +1) |
| (NACK, ACK, ACK) | (3, +1) |
| (NACK, ACK, NACK) | (2, −1) |
| (NACK, NACK, ACK) | (3, +j) |
| (NACK, NACK, NACK) | (3, −1) |

For example, an ACK/ACK/ACK is detected when BS 102 receives a "+1" on channel '1'; an ACK/ACK/NACK is detected when BS 102 receives a "+j" on channel '1'; and ACK/ACK/NACK is detected when BS 102 receives a "−j" on channel '1'. Additionally, an ACK/NACK/NACK is detected when BS 102 receives a "+1" on channel '2' and an NACK/ACK/NACK is detected when BS 102 receives a "−1" on channel '2'. Further, an NACK/ACK/ACK is detected when BS 102 receives a "+1" on channel '3'; an NACK/NACK/ACK is detected when BS 102 receives a "+j" on channel '3'; and NACK/NACK/NACK is detected when BS 102 receives a "−1" on channel '3'.

In some embodiments, two PUCCHs carry signals for the transmission of multiple UL AN bits. The two PUCCHs are selected among the assigned PUCCHs. There exist $N_{carrier}^{DL} (N_{carrier}^{DL}-1)/2$ ways to select two PUCCHs among these $N_{carrier}^{DL}$ PUCCHs. In such embodiments, multiple AN bits are associated with the two selected PUCCH indices i and l, and QPSK symbol $q_i$ and $q_l$, sent over PUCCHs i and l. The association rules can be optimized for different purposes.

In one example, three PUCCH resources '1', '2' and '3' are reserved for the AN transmissions associated with the DL transmission in three component carriers. One example association is shown in Table 3. For instance, when AN bits are (ACK,ACK,ACK), QPSK symbols (+1,+1) are transmitted in the selected PUCCH channels, i.e., PUCCH channels 1 and 2.

TABLE 3

An example association from the selected PUCCH
indices i, l and QPSK symbol $q_i$, $q_l$ to three AN bits

| AN Bits | $(i, l, q_i, q_l)$ |
|---|---|
| (ACK, ACK, ACK) | (1, 2, +1, +1) |
| (ACK, ACK, NACK) | (1, 2, +j, +j) |
| (ACK, NACK, ACK) | (1, 2, −j, −j) |
| (ACK, NACK, NACK) | (2, 3, +1, +1) |
| (NACK, ACK, ACK) | (1, 3, +1, +1) |
| (NACK, ACK, NACK) | (2, 3, −1, −1) |
| (NACK, NACK, ACK) | (1, 3, +j, +j) |
| (NACK, NACK, NACK) | (1, 3, −1, −1) |

In some embodiments, each of the transmit antennas at SS 116, when multiple antennas are available, separately carries AN signals in distinct PUCCH resources. In particular, when the number of transmit antennas $N_{Tx}$ are greater than or equal to the number of DL carriers $N_{carrier}^{DL}$ in which an SA of SS 116 assigns RBs, a subset of antennas are selected for the PUCCH AN transmission. In one example, antenna port i is chosen for PUCCH i, where i=1, . . . , $N_{carrier}^{DL}$. In such embodiments, any of the above methods can be used for associating multiple AN bits to the symbols in the assigned PUCCHs.

Figure 17:
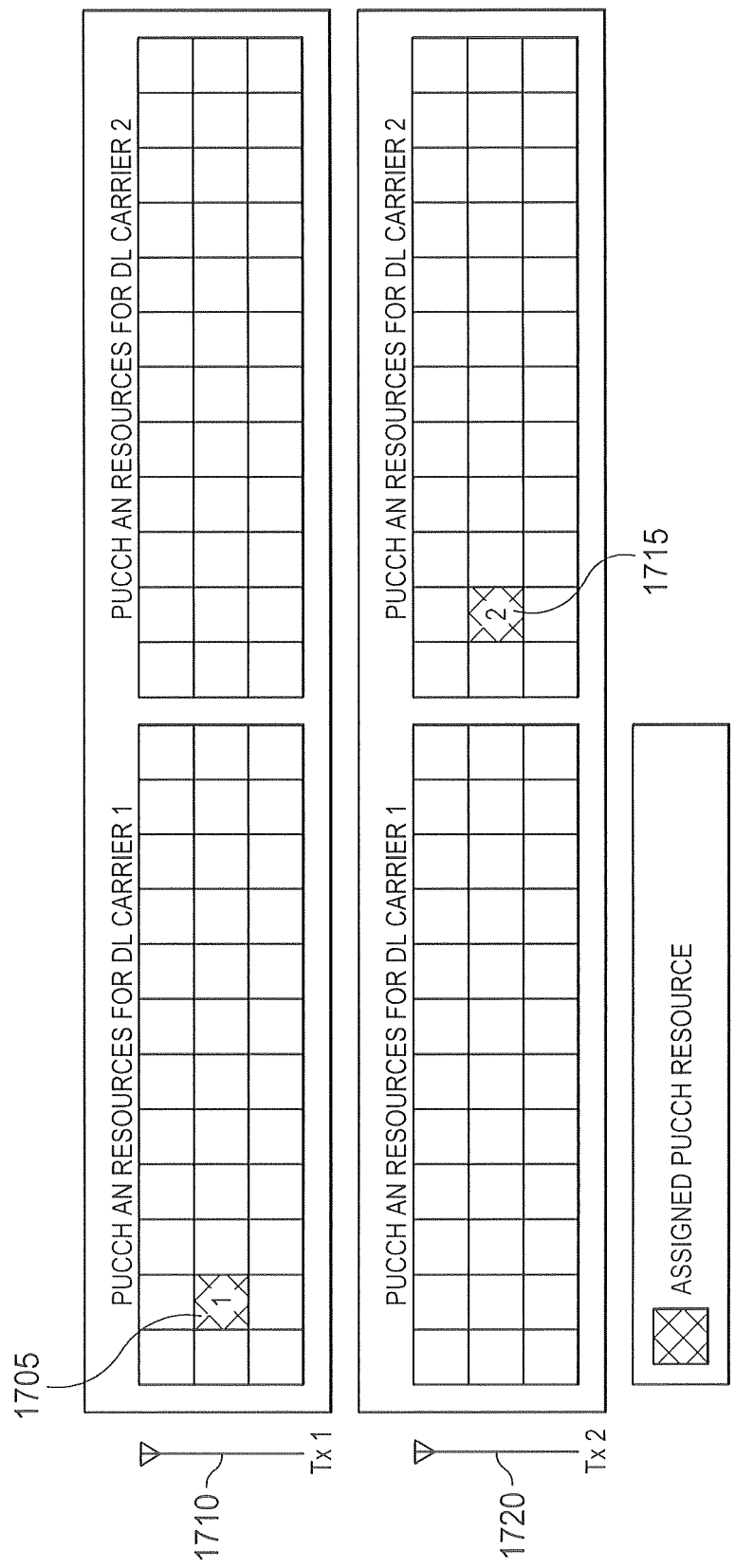
FIG. 17 illustrates exemplary methods where PUCCH carries an ACK/NACK according to embodiments of the present disclosure.

FIG. 17 illustrates exemplary methods where PUCCH carries an ACK/NACK according to embodiments of the present disclosure. The embodiment of the methods shown in FIG. 18 is for illustration only. Other embodiments could be used without departing from the scope of this disclosure.

Each PUCCH carries AN bits in sub-frame n associated with the DL transmission in DL carrier i in sub-frame n−1. Two PUCCH resources '1' and '2' are assigned for the UL AN transmission in response to a DL transmission in two component carriers. PUCCH1 1705 is transmitted on antenna port1 1710, while PUCCH2 1715 is transmitted on antenna port2 1720.

When the number of transmit antenna $N_{Tx}$ is smaller than or equal to the number of DL carriers $N_{carrier}^{DL}$ in which an SA of SS 116 assigns RBs, either PUCCH resources are partitioned into $N_{Tx}$ partitions, such that a PUCCH in partition i is transmitted in antenna port i, where i=1, . . . $N_{Tx}$, or only $N_{Tx}$ number of PUCCHs are selected out of $N_{carrier}^{DL}$ assigned PUCCHs so that PUCCH i is transmitted in antenna port i.

In one example wherein each of the transmit antennas separately carries AN signals in distinct PUCCH resources, each PUCCH carries an AN using in sub-frame n associated with the DL transmission in DL carrier i in sub-frame n−1 when $N_{carrier}^{DL}$=3 and $N_{Tx}$=2. The assigned PUCCHs '1', '2' and '3' are partitioned into ('1', '2') 1705 and '3' 1715, and PUCCHs ('1', '2') 1705 are transmitted by transmit antenna port1 1710, while PUCCH3 1715 is transmitted by transmit antenna port two 1720 at SS 116.

In another example wherein each of the transmit antennas separately carries AN signals in distinct PUCCH resources, only two selected PUCCHs carries AN signals when $N_{carrier}^{DL}$=3 and $N_{Tx}$=2. The selected PUCCH indices and their QPSK symbols can be associated with AN bits as in Table 3. Then, a transmit antenna port is paired with a PUCCH index, and carries signals in the paired PUCCH. For example, when the decoding result is (ACK,ACK,ACK), SS 116 is supposed to send QPSK symbols +1 and +1 through PUCCH1 1705 and PUCCH2 1715, respectively, according to Table 3. Then, PUCCH1 1705 is mapped onto time-frequency resource in antenna port1 1710, while PUCCH2 1715 is in antenna port2 1720; each of these two transmit antennas 1710, 1720 transmit QPSK symbol +1 on its allocated PUCCH resource.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network, a subscriber station capable of communicating with a plurality of base stations and configured with two downlink carriers, the subscriber station comprising:

a receiver configured to receive, on one of the two downlink carriers, at least one of a first downlink grant on a first set of Physical Downlink Control CHannel (PDCCH) control channel elements (CCEs) and a second downlink grant on a second set of PDCCH CCEs, wherein the first downlink grant schedules a Physical Downlink Shared CHannel (PDSCH) on a first downlink carrier of the two downlink carriers and the second downlink grant schedules a PDSCH on a second downlink carrier of the two downlink carriers; and a transmitter configured to derive a number of hybrid automatic repeat-request (HARQ) resource indices to convey HARQ information for the PDSCH, wherein a number of Physical Uplink Control CHannel (PUCCH) HARQ acknowledgement (HARQ-ACK) resource indices is determined based upon a number of received downlink grants and each of the PUCCH HARQ-ACK resource indices is determined according to $n_{PUCCH}^{(1)} = n_{CCE} + N_{PUCCH}^{(1)}$, where $n_{CCE}$ is a smallest CCE number within a respective one of the first or the second PDCCH CCE set and $N_{PUCCH}^{(1)}$ is a first parameter, and wherein HARQ-ACK information is conveyed by selecting one PUCCH HARQ-ACK resource among a number of PUCCH HARQ-ACK resources and transmitting a quadrature phase shift keying (QPSK) symbol on the selected PUCCH HARQ-ACK resource.

2. The subscriber station according to claim 1, wherein $N_{PUCCH}^{(1)}$ is configured by higher layers.

3. The subscriber station according to claim 1, wherein the PDSCH for a subframe n is dynamically scheduled.

4. The subscriber station according to claim 1, wherein the PDSCH for a subframe n is scheduled within a subframe preceding the subframe n.

5. The subscriber station according to claim 1, wherein an orthogonal sequence index and a cyclic shift may be determined from the PUCCH HARQ-ACK resource indices.

6. The subscriber station according to claim 1, wherein the orthogonal sequence index and the cyclic shift uniquely identify a resource.

7. The subscriber station according to claim 1, wherein the PUCCH HARQ-ACK resource indices are non-negative.

8. The subscriber station according to claim 1, wherein two PUCCH resources are allocated for HARQ-ACK transmission in two component carriers.

9. The subscriber station according to claim 1, wherein three PUCCH resources are allocated for HARQ-ACK transmission in three component carriers.

10. A base station capable of wireless communications with a subscriber station configured with two downlink carriers, the base station comprising:

a transmitter configured to transmit, on one of the two downlink carriers, at least one of a first downlink grant on a first set of Physical Downlink Control CHannel (PDCCH) control channel elements (CCEs) and a second downlink grant on a second set of PDCCH CCEs, wherein the first downlink grant schedules a Physical Downlink Shared CHannel (PDSCH) on a first downlink carrier of the two downlink carriers and the second downlink grant schedules a PDSCH on a second downlink carrier of the two downlink carriers; and a receiver configured to receive a quadrature phase shift keying (QPSK) symbol on a selected Physical Uplink Control CHannel (PUCCH) hybrid automatic repeat-request (HARQ) acknowledgement (ACK) resource among a number of PUCCH HARQ-ACK resources, wherein HARQ-ACK information is conveyed by the selection of the PUCCH HARQ-ACK resource, wherein a number of HARQ resource indices are employed to convey HARQ information for the PDSCHs, and wherein a number of PUCCH HARQ-ACK resource indices is determined based upon a number of received downlink grants and each of the PUCCH HARQ-ACK resource indices is determined according to $n_{PUCCH}^{(1)} = n_{CCE} + N_{PUCCH}^{(1)}$, where $n_{CCE}$ is a smallest CCE number within a respective one of the first or the second PDCCH CCE set and $N_{PUCCH}^{(1)}$ is a first parameter.

11. The base station according to claim 10, wherein $N_{PUCCH}^{(1)}$ is configured by higher layers.

12. The base station according to claim 10, wherein the PDSCH for a subframe n is dynamically scheduled.

13. The base station according to claim 10, wherein the PDSCH for a subframe n is scheduled within a subframe preceding the subframe n.

14. The base station according to claim 10, wherein an orthogonal sequence index and a cyclic shift may be determined from the PUCCH HARQ-ACK resource indices.

15. The base station according to claim 10, wherein the orthogonal sequence index and the cyclic shift uniquely identify a resource.

16. The base station according to claim 10, wherein the PUCCH HARQ-ACK resource indices are non-negative.

17. The base station according to claim 10, wherein two PUCCH resources are allocated for HARQ-ACK transmission in two component carriers.

18. The base station according to claim 10, wherein three PUCCH resources are allocated for HARQ-ACK transmission in three component carriers.

19. A method of communicating with a plurality of base stations from a subscriber station configured with two downlink carriers, the method comprising:

receiving, on one of the two downlink carriers, at least one of a first downlink grant on a first set of Physical Downlink Control CHannel (PDCCH) control channel elements (CCEs) and a second downlink grant on a second set of PDCCH CCEs, wherein the first downlink grant schedules a Physical Downlink Shared CHannel (PDSCH) on a first downlink carrier of the two downlink carriers and the second downlink grant schedules a PDSCH on a second downlink carrier of the two downlink carriers; and deriving a number of hybrid automatic repeat-request (HARQ) resource indices to convey HARQ information for the PDSCH, wherein a number of Physical Uplink Control CHannel (PUCCH) HARQ acknowledgement (HARQ-ACK) resource indices is determined based upon a number of received downlink grants and each of the PUCCH HARQ-ACK resource indices is determined according to $n_{PUCCH}^{(1)} = n_{CCE} + N_{PUCCH}^{(1)}$, where $n_{CCE}$ is a smallest CCE number within a respective one of the first or the second PDCCH CCE set and $N_{PUCCH}^{(1)}$ is a first parameter, and wherein HARQ-ACK information is conveyed by selecting one PUCCH HARQ-ACK resource among a number of PUCCH HARQ-ACK resources and transmitting a quadrature phase shift keying (QPSK) symbol on the selected PUCCH HARQ-ACK resource.

20. The method according to claim 19, wherein $N_{PUCCH}^{(1)}$ is configured by higher layers.

21. The method according to claim 19, wherein the PDSCH for a subframe n is dynamically scheduled.

22. The method according to claim 19, wherein the PDSCH for a subframe n is scheduled within a subframe preceding the subframe n.

23. The method according to claim 19, wherein an orthogonal sequence index and a cyclic shift may be determined from the PUCCH HARQ-ACK resource indices.

24. The method according to claim 19, wherein the orthogonal sequence index and the cyclic shift uniquely identify a resource.

25. The method according to claim 19, wherein the PUCCH HARQ-ACK resource indices are non-negative.

26. The method according to claim 19, wherein two PUCCH resources are allocated for HARQ-ACK transmission in two component carriers.

27. The method according to claim 19, wherein three PUCCH resources are allocated for HARQ-ACK transmission in three component carriers.

* * * * *